United States Patent Office 3,320,184
Patented May 16, 1967

3,320,184
SILICON-CONTAINING POLYISOCYANATES
Walter Fink, Zurich, Switzerland, assignor to Monsanto Company, a corporation of Delaware
No Drawing. Filed Dec. 9, 1963, Ser. No. 329,258
Claims priority, application Switzerland, Dec. 13, 1962, 14,561/62
14 Claims. (Cl. 260—2)

It has been found that a new kind of silicon-containing, heterocyclic triisocyanates can be prepared from cyclic diorganosilanes and divalent isocyanates.

The cyclic diorganosilazanes which serve as starting compounds are especially the well known trimeric and tetrameric diorganosilazanes. They can easily be obtained from diorganosilicon halides and ammonia, using conventional methods giving quantitative yields. They possess one of the following formulae

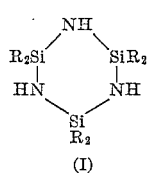 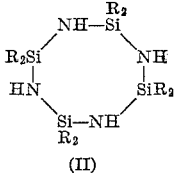

(I)          (II)

In these formulae R is an organic radical, an optional aliphatic, cycloaliphatic, araliphatic, armoatic or heterocyclic radicals, insofar as they may occur in such compounds. These radicals may be unsaturated or contain substituents. Moreover, both radicals being on the same silicon atom may be different from one another. Normally R will not have more than 18 carbon atoms.

In the literature compounds of type (I) are reported, in which either all of the R are alike, namely methyl, ethyl, n-butyl or phenyl, or in which both radicals on the same silicon atoms are each different, namely methyl/ethyl, or methyl/phenyl. Compounds of type (II) have been known up to now in which R=methyl or ethyl.

But, there is no doubt that using the same methods which lead to these known compounds, a great number of new similarly made hexaorganocyclotrisilazanes and octaorganocyclotetrasilazanes can be prepared and reacted in the manner described below with divalent isocyanates in order to get the silicon-containing heterocyclic triisocyanates of the invention. A certain limitation of the starting compounds seems to depend only on the fact that probably no cyclosilazanes are available in which R is a sterically voluminous group, such as, for example, tertiary butyl or 1-naphthyl. Especially suitable are cyclic silazanes wherein R is hydrocarbon having not more than 18 carbon atoms and among the aliphatic hydrocarbon groups primary and secondary alkyl having not more than 8 carbon atoms. Of course, in addition to these generally available 6- and 8-membered cyclosilazanes, those having smaller or bigger rings and polymers, as far as these can be prepared, will also be applicable to put the present invention into practice.

A great number of divalent isocyanates to be used herein as a second reactant are known. They correspond to the general formula

R'(NCO)₂ wherein R' signifies a divalent organic radical as usually occurring in such compounds. Especially suitable R' divalent radicals are the hydrocarbon radicals having not more than 18 carbon atoms. All types of difunctional isocyanates of the aliphatic, hydroaromatic and aromatic range can be added to the cyclosilazanes to give the novel products. Examples are 1,2-diisocyanatoethane, 1,3-diisocyanatopropane, 1,4-diisocyanatobutane, diisocyanatoethylethane, diisocyanatophenylethane, 1,6-diisocyanatohexane, 1,8-diisocyanatooctane, 1,4-diisocyanatocyclohexane, 1,3-diisocyanatocyclohexane, 4,4'-diisocyanatodicyclohexylmethane, 1,4-diisocyanatobenzene, 1,3-diisocyanatobenzene, 1-chloro-2,4-diisocyanatobenzene, 2,4- and 2,6-diisocyanatotoluene and the commercial mixture 65:35 or 80:20 thereof, 4,4'-diisocyanatodiphenylmethane, 3,3'-dimethoxy-4,4'-diisocyanatodiphenyl, 1,5- and 1,8-diisocyanatonaphthalene.

Further, dimerisation products of diisocyanates, i.e. uretdiones, still containing two free isocyanate groups.

In question come also diisocyanates in which the hydrocarbon radicals are linked through heteroatoms or heteroatom groups like S, S₂, (CH₂)₃S(CH₂)₃, NH, SO₂, SO₂NH, SO₂NHCH₂CH₂NHSO₂, CO, CO₂NH, N=N, OCH₂CH₂O, NHCONH, etc. The diisocyanates which can be used herein may also contain unsaturated organic radicals, such as 4,4'-diisocyanatostilbene. Other unsaturated diisocyanates are obtained for example by the reaction of 2 moles of diisocyanatotoluene with 1 mole of an unsaturated diol such as 1,4-butenediol, 1,4-butinediol etc. Finally, it also should be mentioned that the reaction products of 1 mole of a triisocyanate with 1 mole of a compound containing an active hydrogen like alcohols, phenols, mercaptans, amines etc. are also useful.

In the preparation of the products of invention starting with the above described cyclosilazanes and diisocyanates without using a catalyst it is absolutely necessary to select the molar proportion of the reactants so that for each amino group which is present, more than 4 molecules of the diisocyanate are present. Although theoretically only 4 moles of the diisocyanate would be needed for the reaction, it has been found that without an excess of diisocyanate polymeric compounds are formed. A large excess of diisocyanate (5 moles and more per NH group) is expediently used, thereby the diisocyanate simultaneously acts as a solvent. Without catalysts the reaction is preferably carried out at temperatures in the range of about 120° to 180° C.; however, in the presence of catalysts the reaction can be carried out at temperatures in the range of about 80 to 180° C. Thorough investigations surprisingly have shown that the trimeric and tetrameric diorganocyclosilazanes used in the reaction are completely cleaved by the action of the diisocyanate and then recombined to give novel rings which have not been known hitherto. In this reaction are consumed per cyclotrisilazane (I) 12 moles, and per cyclotetrasilazane (II) 16 moles of the diisocyanate.

Equimolar quantities of two end products are mainly formed in this reaction which proceeds via different intermediary stages. One of these products possesses 3 free reactive isocyanate groups. These triisocyanates being the object of the present invention, correspond to the following formula:

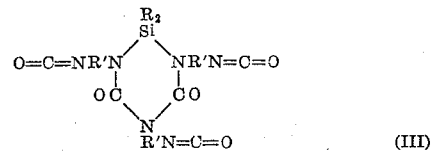

(III)

wherein R and R' have the significance as defined before. They can therefore be designed as diketo-N-triisocyanato-Si-diorgano-1,3,5-triabasilines. The second, simultaneously arising product is a diisocyanate unknown up to now, of the formula

O=C=N—R'—NH—CO—N=C=O wherein R' again is defined as before, has to be attributed.

In carrying out the addition reaction, the reactants are thoroughly mixed under exclusion of moisture, and heated at a higher temperature for some time. The reaction temperature and reaction time is directed by the reactivity of the diisocyanate. It is well known that the aromatic diisocyanates react more easily than the aliphatic ones. By using diisocyanates which have in their molecules 2 isocyanate groups of different reactivity, as for example in 4,4'-diisocyanatohexahydrodiphenyl, isocyanatoethyl-3-isocyanatobenzene, etc., it can be anticipated which of the two isocyanate groups will then be present in the end product as a free isocyanate group. It was found that the reaction may be promoted by addition of a catalyst. Thus, lower reaction temperatures and shorter reaction times can be employed. The use of appropriate catalysts makes it possible also to work in an inert solvent without excess of isocyanate. Suitable catalysts are primary, secondary and tertiary amines, such as butylamine, dibutylamine, tributylamine, cyclohexylamine, aniline, pyridine, methylpyridine, dimethylpiperazine, hexahydrodimethylaniline etc., as well as their hydrochlorides. Further catalysts are alcoholates, sodium amide, alkali and alkaline earth hydroxides, potassium oxide, zinc bromide, Grignard compounds, tertiary phosphines, tin hydrides, Friedel-Crafts catalysts, hydrochloric acid, phosphorus pentachloride, carboxylic chlorides and trifluoroacetic acid. The kind of catalytic reaction occurring with the help of such catalysts is not yet entirely elucidated. In order to separate the 2 main products, the fact is turned to profit, that the nitrogen-containing diisocyanates resulting from the reaction, as well as the diisocyanates used in the reaction, are soluble in aliphatic hydrocarbons (e.g. hexane) or alicyclic hydrocarbons (e.g. cyclohexane), while the heterocyclic triisocyanates formed are insoluble therein. The latter can for this reason be precipitated from their solution in aromatics, e.g. benzene, by hexane and reprecipitated or extracted in order to achieve further purification. For many purposes the mixture can, possibly upon removal of the solvent, or excess diisocyanate respectively, be directly processed, since in any case it is a matter of reactive isocyanates.

The triisocyanate and diisocyanate products of invention are accessible to all the reactions proper to the usual diisocyanates and triisocyanates, and have the same uses as are known for the usual diisocyanates and triisocyanates. It has been found that the novel compounds can be converted into a polymer by heating at temperatures between above the optimum temperature limit of reaction and below the temperature of decomposition. In this polymer the content of free isocyanate groups is strongly decreased, or restricted to the end groups only, respectively. The polymers of the invention are useful especially as vehicle for baked surface coatings and in cast plastic articles.

*Example 1*

To 78.37 g. (0.45 mole) of freshly distilled 2,4-diisocyanatotoluene (B.P. 121–122° C./12 mm.) are added with stirring at room temperature 5.45 g. (0.025 mole) of pure hexamethylcyclotrisilazane. The mixture is subsequently stirred at 120–140° C. for 8 to 16 hours under exclusion of moisture. The content of the flask is taken up in 250 ml. of benzene and precipitated by hexane. The oil which separates thereby solidifies. The crystal paste is filtered off (49.1 g.) and purifies by recrystallization.

Yield 41.97 g. (=101.6%). Yellowish powder.

*Analysis.*—$C_{28}H_{24}N_6O_5Si$ (552.64) calc'd percent: C, 60.85; H, 4.37; N, 15.20. Found percent: C, 60.30; H, 4.26; N, 16.37.

The determination of the free isocyanate groups by decomposition with diphenylsilanol $(C_6H_5)_2Si(OH)_2$ showed 3.1 OCN groups per molecule.

When the same experiment is carried out at a reaction temperature of 150–180°, the content of free OCN groups is yet only 2.75. The upper limit of optimum reaction temperature lies therefore at about 140° C.

14.446 g. of the compound as prepared above are tempered at 200±5° C. The loss of weight after the cited time period is 2.27%. The compound being liquid at first is converted into a hard elastic mass. From the infrared spectrum it is apparent that the number of free OCN groups is decreased by about ⅔. The product is now polymeric.

*Example 2*

To 75.6 g. (0.45 mole) of hexamethylenediisocyanate are added with stirring at room temperature 5.45 g. (0.025 mole) of hexamethylcyclotrisilazane and the mixture is kept at 160–180° for two days. Upon addition of hexane an oily substance separates (48.5 g.), which is purified by dissolution in benzene and reprecipitation with hexane.

Yield 40.89 g. (=102.5%), thick, yellowish liquid.

*Analysis.*—$C_{25}H_{42}N_6O_5Si$ (534.75) calc'd percent: C, 56.11; H, 7.97; N, 15.71. Found percent: C, 56.38; H, 7.95; N, 16.12.

The determination of the free isocyanate groups by decomposition with diphenylsilanol $(C_6H_5)_2Si(OH)_2$ showed 2.75 OCN groups per molecule.

The upper limit of optimum reaction temperature in this case lies at about 160° C.

*Example 3*

To 225.2 g. (0.9 mole) of diphenylmethane-4,4'-diisocyanate are added with stirring at room temperature 10.97 g. of hexamethylcyclotrisilazane (0.05 mole) and the mixture is kept at 180° C. for 16 hours. After taking up in benzene and precipitating with hexane the crude product (136.5 g.) is purified by reprecipitation.

Yield 116.18 g. (=99.07%).

*Analysis.*—$C_{46}H_{36}N_6O_5Si$ (780.93) calc'd percent: C, 70.75; H, 4.65; N, 10.76. Found percent: C, 71.10; H, 4.61; N, 11.05.

The determination of the free isocyanate groups by decomposition with diphenylsilanol $(C_6H_5)_2Si(OH)_2$ showed 3.01 OCN groups per molecule.

What is claimed is:

1. A process for preparing silicon-containing heterocyclic triisocyanates comprising reacting a cyclosilazane of the formula [—(R)$_2$Si—NH—]$_n$ wherein R is hydrocarbon having not more than 18 carbon atoms which is not sterically voluminous and $n$ is an integer from 2 to 4, with a diisocyanate of the formula R'(NCO)$_2$ wherein R' is a divalent hydrocarbon radical having not more than 18 carbon atoms, at a temperature of about 120° to 180° C., using a molar ratio of at least 4 moles of diisocyanate per imino group, and in the absence of moisture.

2. A process of claim 1 wherein said cyclosilazane is a hexahydrocarbylcyclotrisilazane.

3. A process of claim 1 wherein said cyclosilazane is an octahydrocarbylcyclotetrasilazane.

4. A process of claim 1 wherein excess diisocyanate over the 4:1 molar ratio of diisocyanate to imino group is used as a solvent for the reaction.

5. A process of claim 1 wherein the triisocyanate product is separated from the reaction mixture by extraction of the reaction mixture with a solvent selected from the class consisting of aliphatic and alicyclic hydrocarbons.

6. A process of claim 1 wherein the triisocyanate product is separated from the reaction mixture dissolved in an aromatic solvent by treating the reaction mixture solution with a solvent selected from the class consisting of aliphatic and alicyclic hydrocarbons to cause the triisocyanate product to precipitate from the solution.

7. A process of claim 1 wherein the reactants are heated at a temperature in the range of 80° to 180° C., in the presence of a catalyst for an isocyanate and silazane reaction selected from the group consisting of primary, secondary and tertiary amines, the hydrochlorides of said amines, alcoholates, sodium amide, alkali and alkaline earth hydroxides, potassium oxide, zinc bromide, Grignard compounds, tertiary phosphines, tin hydrides, Friedel-Crafts catalysts, hydrochloric acid, phosphorus pentachloride, carboxylic chlorides and trifluoroacetic acid.

8. A process of claim 1 wherein $n$ is 3, R is selected from the class consisting of primary and secondary alkyl having not more than 8 carbon atoms, and R' is a divalent hydrocarbon radical having no more than 18 carbon atoms.

9. A silicon-containing heterocyclic triisocyanate of the formula

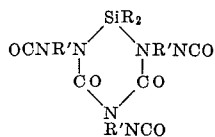

wherein R is hydrocarbon having not more than 18 carbon atoms, which is not sterically voluminous and R' is a hydrocarbon having not more than 18 carbon atoms.

10. A triisocyanate of claim 9 wherein R is selected from the class consisting of primary and secondary alkyl having not more than 18 carbon atoms, and R' is a divalent hydrocarbon radical having not more than 18 carbon atoms.

11. A triisocyanate of claim 9 wherein R is methyl and R' is 2,4-divalent toluene.

12. A triisocyanate of claim 9 wherein R is methyl and R' is hexamethylene.

13. A triisocyanate of claim 9 wherein R is methyl and R' is 4,4'-divalent diphenylmethane.

14. A polymer of a silicon-containing heterocyclic triisocyanate of the formula

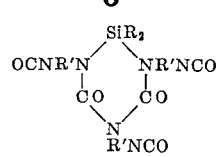

wherein R is hydrocarbon having not more than 18 carbon atoms, which is not sterically voluminous and R' is a hydrocarbon having not more than 18 carbon atoms, formed by heating said silicon-containing heterocyclic triisocyanate at a temperature above the optimum temperature of reaction and below the temperature of decomposition.

References Cited by the Examiner

UNITED STATES PATENTS

| | | | |
|---|---|---|---|
| 2,462,635 | 2/1949 | Haber | 260—448.2 |
| 3,032,530 | 5/1962 | Falk | 260—46.5 |
| 3,147,296 | 9/1964 | Fein et al. | 260—453 |
| 3,178,391 | 4/1965 | Holtschmidt et al. | 260—46.5 |
| 3,179,713 | 4/1965 | Brown | 260—46.5 |
| 3,180,883 | 4/1965 | Case | 260—453 |

OTHER REFERENCES

Rochow, "Chemistry of the Silicones," 2nd edition, Wiley and Sons, Inc., New York, 1951, pp. 74–75. Found in Scientific Library, Q.D. 412 56 R6.

LEON J. BERCOVITZ, *Primary Examiner.*

DONALD E. CZAJA, *Examiner.*

M. I. MARQUIS, *Assistant Examiner.*